N. C. Lewis.
Making File-Blanks.
Nº 29,500. Patented Aug. 7, 1860.
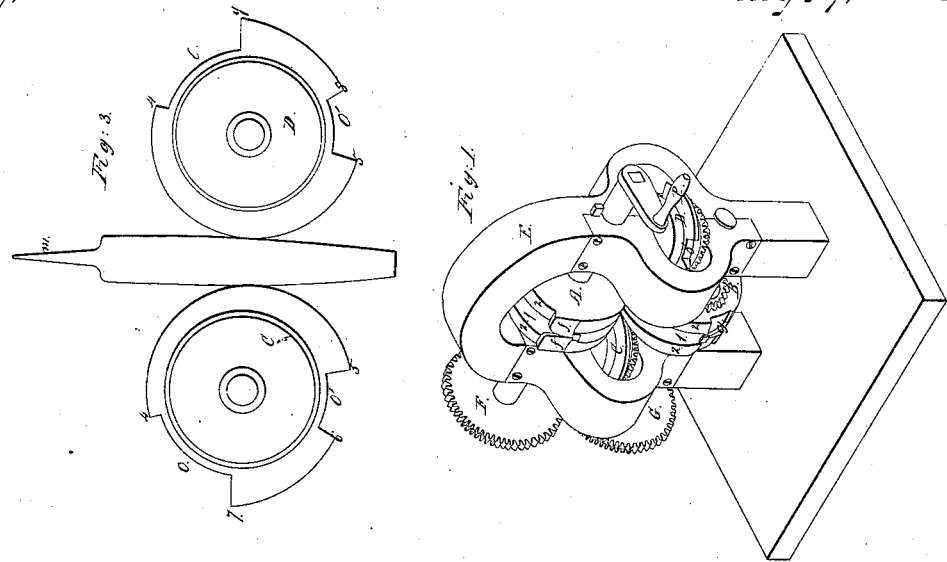
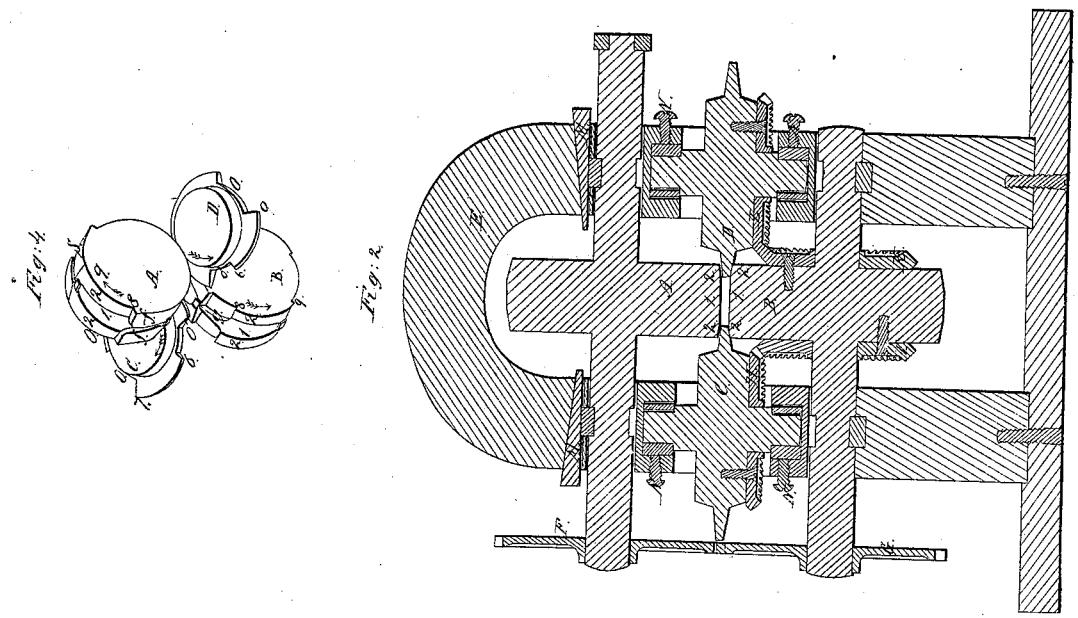
Witnesses:
Inventor:
N. C. Lewis

UNITED STATES PATENT OFFICE.

N. C. LEWIS, OF BOSTON, MASSACHUSETTS.

MACHINE FOR ROLLING BLANKS.

Specification of Letters Patent No. 29,500, dated August 7, 1860.

*To all whom it may concern:*

Be it known that I, N. C. LEWIS, of Boston, in the county of Suffolk and State of Massachusetts, have made certain Improvements in Machines for Rolling File-Blanks and other Similar Articles, of which the following is a full, clear, and exact description, reference being had to the accompanying drawings, making part of this specification, in which—

Figure 1, is a perspective view of the machine. Fig. 2, a vertical section through the same. Fig. 3, a plan of the eccentric rolls which form the edges of the blank. Fig. 4 a perspective view of the rolls detached from the machine.

Where files are cut by machinery, the blanks are required to be formed with greater exactness as regards uniformity of width and thickness than is necessary for hand cut files.

My invention has for its object to produce such blanks with greater uniformity than has heretofore been attained, and at a reduced cost, and my invention consists in the employment of four eccentric rolls, the axis of one pair being placed at right angles to the axis of the other pair, the whole being so arranged with respect to each other as to act simultaneously upon the metal as will now be more particularly described.

In the accompanying drawings A, B, C, D, are the eccentric rolls which form the sides and the edges of the blank and also carry the shears which form the tang. The vertical rolls A, B, run in suitable bearings in the framework, and are so formed upon their peripheries as to give the required thickness at all points to the blank, and the rolls C and D are so formed as to give it the required width (Fig. 3) the rolls being all caused to move in unison by the gears F, G, H, I, K, and L. The roll A is held down to its work by the wedges M, or it may be adjusted in position with respect to its mate by set screws. The rolls C and D are adjusted by means of the screws N.

The rolls may be made of a size to carry dies for one, two, or more blanks of different sizes. In the machine represented in the drawings, the rolls are calculated for two sizes of blanks. Besides the dies for forming the body of the blank, the rolls A and B carry the shears for cutting away the metal upon each side of the tang. The center blade *g* of the shears is of the exact form of the tang and the blades *f* are so adapted thereto as to cut off the superabundant metal upon each side of it. The central portion of the periphery of the rolls A and B is made perfectly cylindrical for a width corresponding to and varying with the width of the blank at different points. Upon each side of the central portion 1, the rolls A and B, are chamfered as at 2, and between these rolls at the chamfered portions, enter the working portions of the rolls C, D, the edges of these rolls varying in thickness as the distance between the rolls A and B varies. At that portion of their periphery corresponding to the shears *f*, *g* the rolls C, D, are cut away as at O O'. The rolls in the drawings are represented as driven by a crank P, but it is contemplated to drive them by any suitable power and by means of machinery adapted to rotate them only a portion of a circle, to vibrate them through an arc corresponding to the particular size of the blank to be made. As before stated the machine represented in the drawings is calculated for two different blanks.

In operation the rolls are caused to vibrate through an arc slightly greater than the length of the blank to be made. In Fig. 4 they have been rotated backward in the direction of the arrows until the shears are completely exposed. A strip of sheet steel of a width and thickness very slightly exceeding the width and thickness of the blank which is to be formed, and of a suitable length when slightly elongated to form the blank, is entered hot between the rolls, its forward end resting against the stop 3. The rolls now commence upon their return vibration, the blades *f* shearing off the superfluous metal to leave the tang *m* (Fig. 3) of the form of the central blade *g* of the shears. The portion 1, of the two rolls A and B now runs at the exact distance apart to give the required thickness to the blank, and at the same time the eccentric edges of the rolls C and D operate upon the edges of the blank and bring it to the required width. As before stated, the rolls are arranged with two sets of dies and shears for the formation of two blanks of different sizes, the larger one being formed by the portions 4 to 5 of the rolls C, D, and the corresponding portions of the rolls A, B, and has its tang formed by the shears S, which play in the recess O, of the rolls C, D. The smaller blank is formed by the portions 6, to 7, of the rolls C, D, in conjunction with the portions 8 to 9, of the rolls A, B, its tang being formed by the shears $f$, $g$ (Fig. 4) the rolls C, D, being cut away at the points O', where the shears operate.

It is obvious that the rolls may have more than two sets of dies upon them, for the formation of blanks of different sizes in which case they should be arranged so that they may be vibrated through the proper arc to form any particular size, or they may have but a single set of dies, in which case they may be revolved continuously, and it is obvious that such modifications would not alter the spirit of my invention.

Thus far I have described my machine as particularly applicable to rolling file blanks, but it is obvious that the periphery of the rolls may be so varied as to adapt it equally to the manufacture of horse shoes or other articles of irregular shape. I do not therefore limit myself to a machine for the manufacture of any particular article, but intend to employ my invention in those branches of art to which it may be found applicable.

I am aware that four concentric rolls have been arranged upon axes at right angles to each other for the purpose of operating simultaneously upon a bar of metal, I do not therefore lay claim to any such device, but What I do claim as my invention and desire to secure by Letters Patent is—

The combination of four eccentric rolls constructed and arranged with respect to each other as described and of appropriate form to roll file blanks as set forth.

N. C. LEWIS.

Witnesses:
 THOS. R. ROACH,
 THOS. L. GLOVER.